United States Patent [19]

Dumas et al.

[11] Patent Number: 5,478,419
[45] Date of Patent: Dec. 26, 1995

[54] PROCESS FOR THE MANUFACTURE OF A FLAT PRODUCT OF ZIRCONIUM ALLOY COMPRISING HEATING IN THE β RANGE WITH INFRA-RED

[75] Inventors: Gerard Dumas; Pierre Barberis, both of Albertville; Gerard Bunel, Echauffour, all of France

[73] Assignee: Compagnie Europeenne du Zirconium Cezus, Courbevoie, France

[21] Appl. No.: 318,119

[22] Filed: Oct. 5, 1994

[30] Foreign Application Priority Data

Oct. 11, 1993 [FR] France ................................ 93 12330

[51] Int. Cl.$^6$ ....................................................... C22F 1/18
[52] U.S. Cl. ............................................ 148/672; 148/565
[58] Field of Search ................................ 148/565, 672

[56] References Cited

U.S. PATENT DOCUMENTS 4,636,267  1/1987  Jacobsen et al. .
5,223,055  6/1993  Charquet et al. .................. 148/672
5,256,216  10/1993  Bunel et al. ....................... 148/566

FOREIGN PATENT DOCUMENTS 213771      3/1987   European Pat. Off. .
57-188660  11/1982   Japan .
1537930     1/1979   United Kingdom .

*Primary Examiner*—John Sheehan
*Attorney, Agent, or Firm*—Dennison, Meserole, Pollack & Scheiner

[57] ABSTRACT

A process for the manufacture of a flat product of zirconium alloy having a width between 50 and 600 mm from a flat cold rolled product. The cold rolled product is heated to the beta range and maintained in the beta range using an infra-red heating device with a wavelength of between 0.8 and 5 microns, the maximum temperature difference over the width of the product being less than 35° C. The product is then rapidly cooled and optionally annealed to obtain a flat product, which can be a strip, sheet or band.

13 Claims, 3 Drawing Sheets

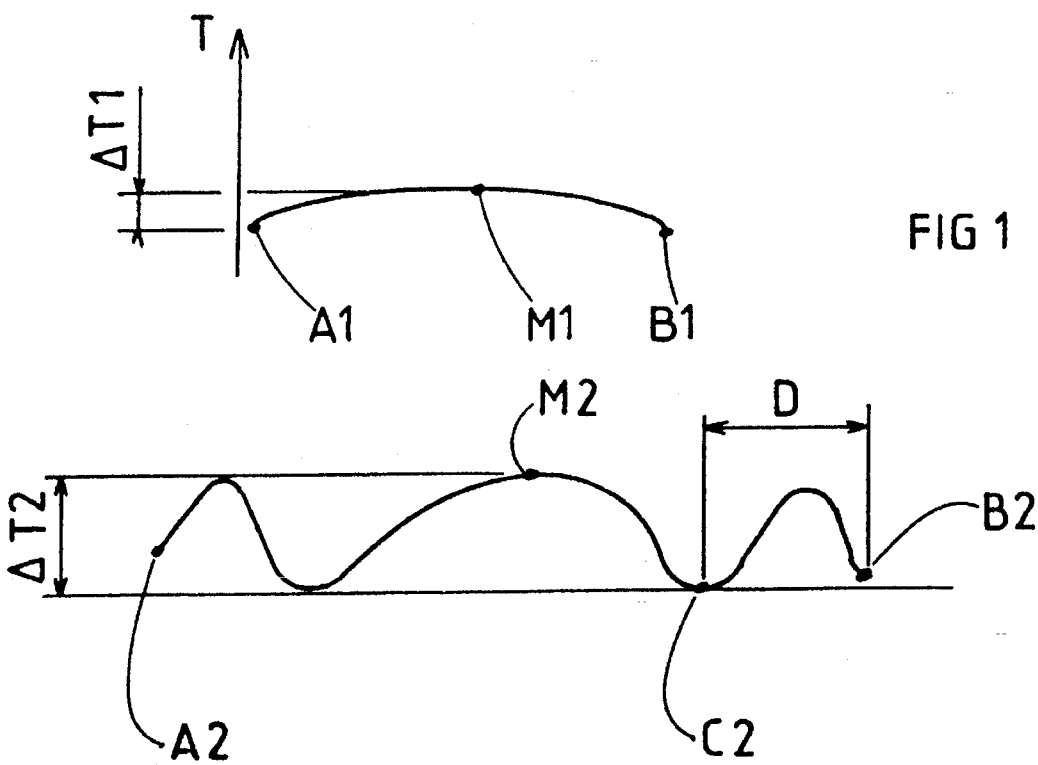
FIG 1
FIG 2
(PRIOR ART)
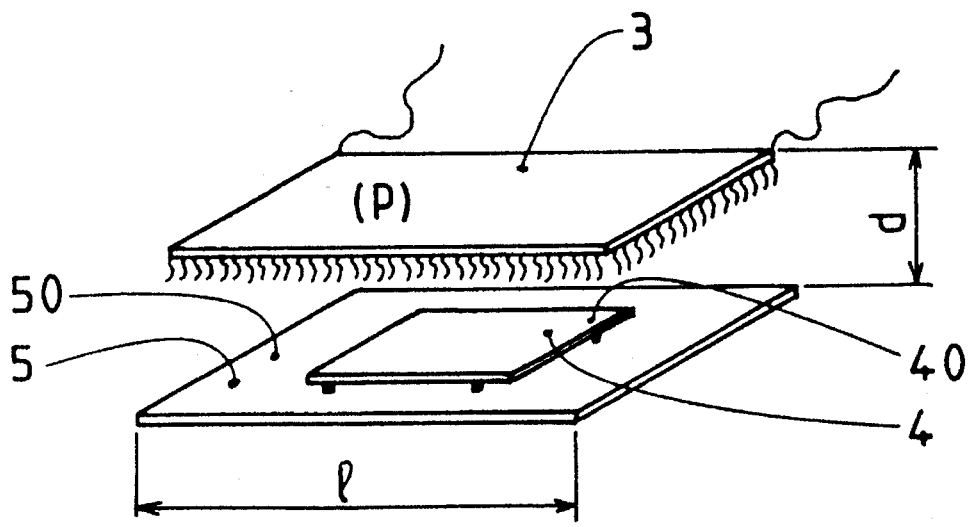
FIG 3

PROCESS FOR THE MANUFACTURE OF A FLAT PRODUCT OF ZIRCONIUM ALLOY COMPRISING HEATING IN THE β RANGE WITH INFRA-RED

The invention relates to a process for the manufacture of a flat product of zirconium alloy consisting of a strip, band or sheet of between 0.4 and 3 mm in thickness, this process comprising, after cold rolling, heating and maintaining in the beta range of said product, said maintaining being followed by rapid cooling.

It is customary to refer to the above heat treatment operations as "tempering from the beta range".

A process of this kind is disclosed in Patent Application FR-A-2673 198, according to which a band of Zircaloy 2 or Zircaloy 4 passes between rollers of at least two couples of successive rollers supplied with electrical current in such a way that a loop of said current is formed with the band. Irregularities in the electrical contact between the rollers and the band make this process difficult to use industrially, since reproducibility and homogeneity of the temperatures reached in the product are unsatisfactory.

FR-A-2303865 - GB-A-1537930 also discloses a process in which a sheet of zirconium alloy for use in a nuclear reactor, for example consisting of Zircaloy 4 of a thickness of 4 mm, is heated to at least 900° C. by high frequency induction. The surface of the sheet is heated. If a lower frequency is used, it is possible for the entire thickness of the sheet to be heated, but there are considerable temperature gradients and deformation during rapid cooling which follows heating. The only heating temperature given by way of example is "900° C.", corresponding to the (alpha+beta) range in the case of Zircaloy 2 or 4.

The Applicant has set out to realise a process for heating and tempering from the beta range, which process is both reproducible and fast, offers more reproducible resistance to corrosion in nuclear reactors, and is obtained by employing said tempering conditions possibly followed by alpha annealing.

The process of the invention is characterised in that said heating and said maintaining are carried out using infra-red lamps with a wavelength of between 0.8 and 5 micrometers, and preferably between 1 and 3 micrometers, which give a maximum temperature difference over the width of the product of less than 35° C., said width being between 50 and 600 mm.

This heating is most frequently carried out in an atmosphere of inert gas, typically with a base of argon, nitrogen or helium, to prevent oxidation of the product. Whereas the temperature profile through the product has variations above 60° C. with transverse flux induction, with lower temperatures between each longitudinal edge and the middle, the profile obtained by infra-red heating levels off with a slight reduction close to each longitudinal edge, the total temperature variation being less than 35° C. in each section. Temperature variations in the longitudinal direction are typically less than 10° C. Heating is very fast, lasting less than 40 secs for example between ambient temperature and 1040° C. for a strip or sheet of 1.4 mm in thickness. The infra-red lamps or tubes are supplied with electrical current and are controlled to give good and reliable heating, with a series of advantages:

much more accurate choice of the position of the minimum and maximum temperatures of the product in the beta range;

much better control of the beta grain size and of the placing in solution before rapid cooling (tempering);

more homogeneous microstructure after cooling;

consequently more regular weight gains with both uniform and nodular corrosion and on average lower weight gains if heating has been carried out in the bottom part of the beta range.

Heating and maintaining in the beta range are preferably carried out using lamps whose infra-red tubes are placed in the longitudinal direction of the flat product, each tube being controlled individually. Therefore, the maximum temperature difference through the product is brought to less than 25° C., and is typically between 10° and 20° C.

The preferred conditions for implementation of the invention can be specified more accurately in the case of Zircaloy 2 and Zircaloy 4 alloys. The compositions of these Zircaloy 2 and Zircaloy 4 alloys are given in the specifications ASTM B 352-85, these alloys corresponding there to the shades R 60804 and R 60802 respectively.

The preferred conditions also apply to the same alloys which are modified by reducing their Sn content to a minimum of 0.5%, and also apply to the Zr-Fe-V alloy described in FR-B-2624136 - US-A-4981527 by the Applicant.

For all the above alloys, the beta range comprises at least the temperature range of 980° to 1100° C.

According to a first preferred condition, the start of rapid cooling has significant importance on the resistance to uniform corrosion on the one hand and nodular corrosion on the other hand. The corresponding gains in surface mass are both greatly reduced if the flat product is cooled at 40° to 100° C./s between 1000° and 800° C.

According to the process of the invention for the manufacture of a flat product, it is often practical to heat the Zr alloy using infra-red lamps which radiate on one face of the product, a refactory which is preferably white being placed a small distance from the other face of the product. Passing from 40 mm to 20 mm from the refractory means that there is a 40 to 60% rise in the temperature increase speed of the product, and the distance is preferably selected so that it is less than 30 mm. A white refractory reflects the greatest part of the heat energy radiated by the other face, and when the infra-red heating is constant a temperature increase speed of the flat product can be obtained which is 1.2 times higher than with a refractory which is dark in colour.

According to a second preferred condition which takes advantage of the excellent homogeneous nature of the temperature of the product due to infra-red heating, the product is heated to a temperature which is typically between 1020° and 1060° C. at all points, before being rapidly cooled. The temperature rise time is particularly short:

from 15 to 40 seconds when the product is between 0.4 and 1.4 mm in thickness:

from 30 to 80 seconds when the product is between 1.4 and 3 mm in thickness.

According to another condition which is imposed generally, in order to restrict the increase in size of the structure of beta orientation in this homogenizing phase prior to rapid cooling, maintaining in the beta range is preferably for 5 to 30 seconds above 980° C.

Finally, according to a third preferred condition, it is often preferable to carry out the series of treatments of the invention in succession, the flat product circulating between an assembly of infra-red tubes and either a refractory placed at less than 30 mm from the product protected by neutral gas, and then circulating through rapid cooling means, for example water or a jet of neutral gas.

According to this treatment technique in succession, the flat product typically being in the form of a band under tension which is pulled between two rollers, a feed roller and a wind-up roller respectively, it has been noted that the heating operation between two assemblies of infra-red tubes which symmetrically heat the two faces of the band greatly restricts deformation across the product after rapid cooling: the change in height across it then being at most 0.5% of its width, whereas with infra-red heating of one face only, the change in height across it is typically 1.5 to 2% of the width.

The flatness of the product after tempering makes it possible to avoid temper rolling between rollers, the irregular work-hardening of which was disadvantageous with respect to the resistance to corrosion, or at least disadvantageous with respect to facilitating the temper rolling, restricting work-hardening irregularities and said disadvantages effect of them.

ADVANTAGE OF THE INVENTION

Obtaining a more uniform structure, with, on average, improved resistance to corrosion and improved reproducibility.

Suppression or restriction of through deformation, avoiding or limiting temper rolling and its harmful effects on resistance to corrosion in a nuclear reactor.

Surprising rapidness of the treatments.

BRIEF DESCRIPTION OF THE DRAWINGS

FIG. 1 is a temperature profile for a flat product of zirconium alloy, with the temperature maintained by an infra-red method according to the invention.

FIG. 2 is a temperature profile for a flat product of zirconium alloy, with the temperature maintained by induction heating according to the prior art.

FIG. 3 shows a group of infra-red heating tests of Zircaloy 4 sheets.

DESCRIPTION OF THE PREFERRED EMBODIMENTS

1) FIGS. 1 and 2

The temperature profiles 1 and 2 obtained by short wavelength infra-red heating (IR) and by electrical induction transverse flux through Zircaloy 4 sheets of 300 mm in width and of between 2 and 3 mm in thickness were compared at 1000° C.

The profile 1 is rounded to become almost flat at 10 to 15 mm from each edge of the sheet corresponding to its ends $A_1$ and $A_2$. The maximum temperature difference $\Delta T1$ is connected with the effect of the edges and is less than 20° C.

The profile 2 is biconcave, with temperature troughs, such as $C_2$ at D=40 to 50 mm from each edge ($A_2$ or $B_2$); the maximum temperature difference $\Delta T2$ is from 60° to 70° C.

Figure 4:
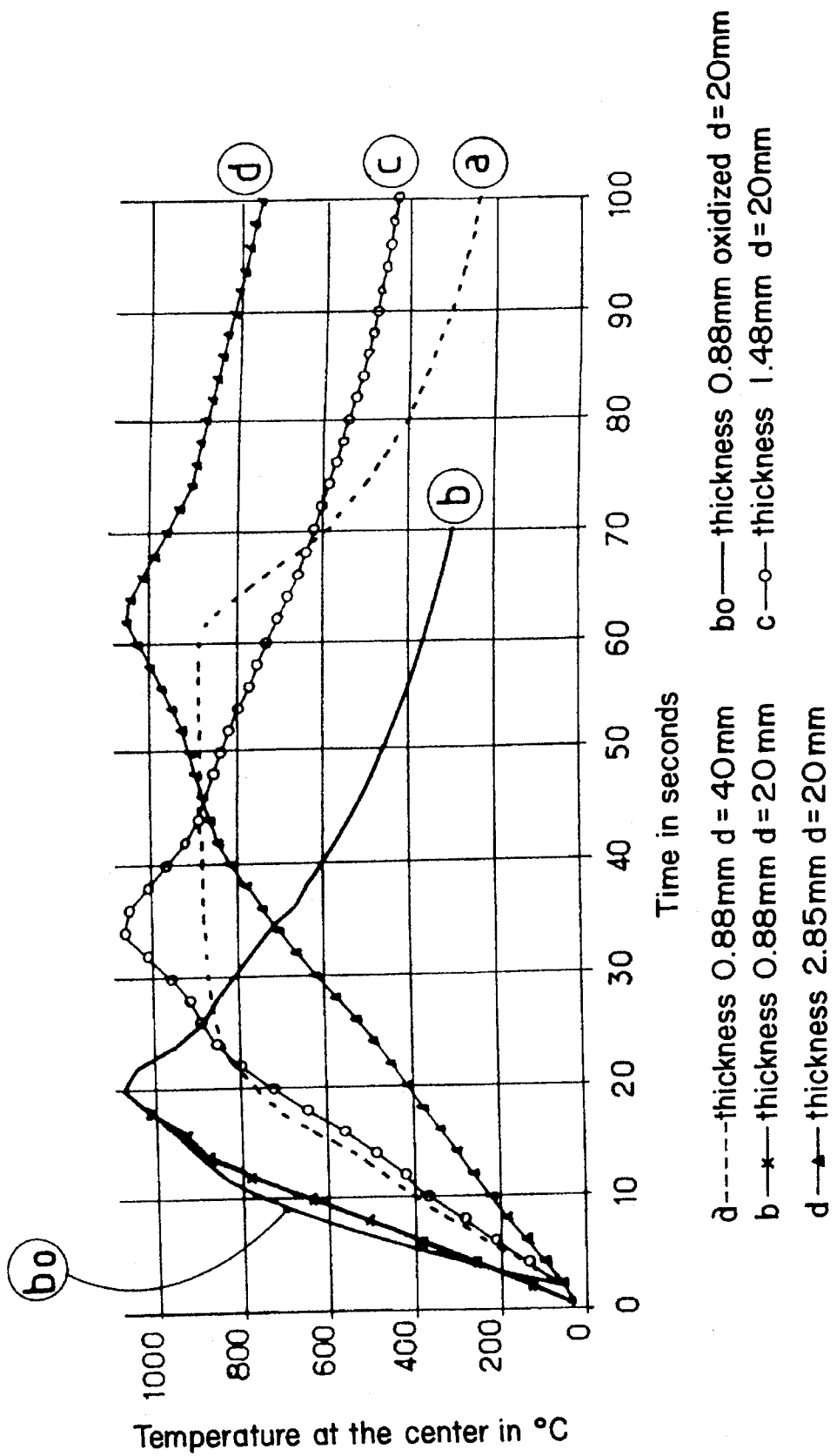
FIG. 4 shows the temperature variations observed on the sheets tested according to the arrangement in FIG. 3.

2) Static Heating Tests with Infra-red Beams of Sheets of Zircaloy 4 - (FIGS. 3 and 4)

2.1 Installation (FIG. 3)

It comprises "short" infra-red tubes (wavelength 1 to 3 micrometers) with a tungsten filament brought to about 2100° C. Alternating current supply 230 v, 3 kW electrical power per tube. Since the tube connections must not exceed 350° C., they are cooled by a considerable current of air: 13 m³/hour/connection. It is also possible to use tubes with water circulation.

The heating panel 3 comprises 6 tubes, that is to say a total power of 18 kW. It develops a power density P of about 180 kW at a distance "d" from the sheet 4 of 40 mm, and of 220 kW/m2 at 20 mm.

The sheet 4 of width 250 mm is placed at a distance "d" alongside the tubes on a base plate 5 which forms a border around the sheet 4 and which is of a width "l" of 300 mm.

2.2. Tests

The temperature of the upper face 40 of the sheet 4 (FIG. 4) of thicknesses 0.88, 1.48 and 2.85 mm successively was studied. Low inertia of the device is indisputable: the panel reaches its operating regime in a few tenths of a second at the most; even when the supply to the panel 3 is interrupted, once the beta transus temperature of between 960° and 980° C. has been exceeded. This brings about great flexibility with the control of the system.

2.2.1. Base plate 5 dark / d=40 mm

Thickness 0.88 mm: curve a

The panel 3 is too far away from the sheet 4 and the "dark" base plate absorbs a large part of the energy radiated by the lower face of the sheet.

Under these conditions the temperature of the sheet 4 quickly rises at 40° C./s before asymptotically tending towards the stationary state at 900° C. where the losses due to radiation and convection compensate for the supply of IR radiation.

2.2.2. White refractory 50/d=20 mm

To increase the yield of the installation, the following was done:

the panel 3 was brought closer, "d" going from 40 to 20 mm;

the plate was placed on a white refractory 50 in order to return a large part of the energy radiated by the lower face.

Improved output results in heat balances over the two faces of the sheet 4 which enabled the beta transus to be exceeded on all the samples tested. The inflections of the curves at about 800° C. and at 950° and 1000° C. made it possible to clearly visualize the biphase (alpha+beta) range.

Once the beta range has been reached, the supply to the panel was interrupted and the cooling phase of the sheet 4 was recorded.

For these infra-red heating tests for one face 40 only of the sheets 4, the balance of the heating and cooling speeds is as follows:

TABLE 1

| | (d = 20 mm) | | | |
|---|---|---|---|---|
| Thickness of metal sheet (mm) | Curve of FIG. 4 | Increase time to 1025° C. (s) | Average increase speed (°C./s) | Average cooling speed from 1000° C. to 800° C. (°C./s) |
| 0.88 | b | 20 | 50 | 25 |
| 0.88, oxidised | bo | 18 | 55 | 25 |
| 1.48 | c | 35 | 25 to 30 | 13 |

TABLE 1-continued (d = 20 mm)

| Thickness of metal sheet (mm) | Curve of FIG. 4 | Increase time to 1025° C. (s) | Average increase speed (°C./s) | Average cooling speed from 1000° C. to 800° C. (°C./s) |
|---|---|---|---|---|
| 2.85 | d | 60 | 15 to 20 | 8 |

The case $b_o$ shows that slight oxidation of the sheet improves the temperature increase speed through better absorption of the IR.

Figure 5:
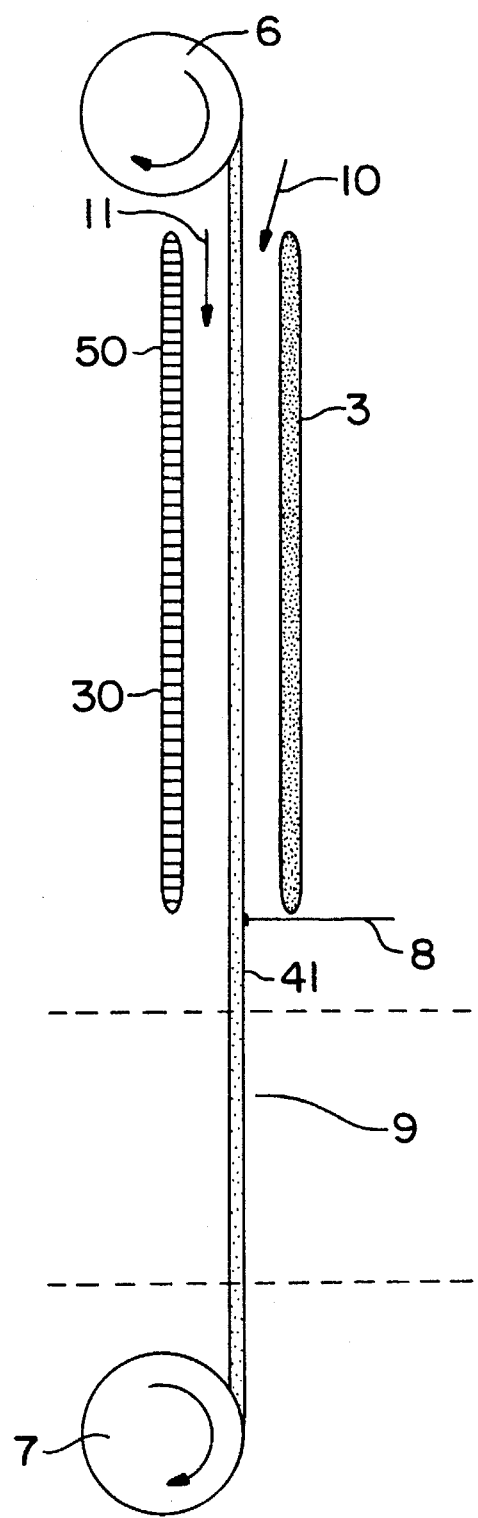
FIG. 5 shows a treatment installation according to the invention of strips of Zr alloy.

3) Treatment Device According to the Invention in Succession (FIG. 5)

The band 41 of Zircaloy 2 or 4 is pulled between two rollers, a feed roller 6 and a wind-up roller 7. It passes between a panel 3 of infra-red lamps or tubes placed 20 mm from the band 41 and a white refractory panel 50 placed at between 10 and 20 mm from the band 41. The movement speed is between 0.7 and 1.5 m/min. A control means 8 for the temperature of the band 41 at the infra-red heating outlet is used at the same time to control the power of the panel 3. The band 41 then passes through a cooling zone 9 through pulsed inert gas, or through water or liquid nitrogen which is sprayed in fine droplets. Inert gas, e.g. argon, helium or nitrogen circulates in the direction of the arrows 10 and 11 over each face of the band 41.

The refractory panel 50 can be replaced by a second infra-red panel 30 placed 20 mm from the band 41. Symmetrical heating means 3 and 30 improve productivity and the quality obtained.

Industrial Application

Fixing and spacing out of pieces, typically standardised and worked pieces, for nuclear reactors with pressurised water or boiling water.

What is claimed is:

1. A process according for manufacture of a flat product of zirconium alloy having a width between 50 and 600 mm from a flat cold rolled product, comprising heating the cold rolled product to the beta range using an infra-red heating device with a wavelength of between 0.8 and 5 microns, the maximum temperature difference over the width being less than 35° C., rapidly cooling the product maintained in the beta range and optionally annealing the rapidly cooled product.

2. A process according to claim 1, wherein the flat product is a strip, band or sheet.

3. A process according to claim 1, wherein said rapid cooling is carried out with water or a jet of neutral gas.

4. A process according to claim 1, wherein said device comprises infra-red tubes placed in a longitudinal direction with respect to said product, each tube being controlled individually.

5. A process according to claim 4, wherein said temperature difference is less than 25° C.

6. A process according to claim 1, wherein said alloy is Zircaloy 2 or Zircaloy 6.

7. A process to claim 6, wherein the rapid cooling of the product comprises cooling of 40 to 100° C./s between 1000 and 800° C.

8. A process according to claim 1, wherein said heating and said maintaining are carried out in the beta range with infra-red beam lamps which radiate on one face of the product and one or more white refractory/refractories placed at least 30 mm from the other face of the product.

9. A process according to claim 6, wherein the product is heated to a temperature of between 1020° and 1060° C. before said rapid cooling, the product being of a thickness of between 0.4 and 1.4 mm, and having a duration of temperature increase between 15 and 40 seconds.

10. A process according to claim 6, wherein the product (4) is heated to a temperature of between 1020° and 1060° C. before said rapid cooling, the product being of a thickness of between 1.4 and 3 mm, and having a duration of temperature increase between 30 and 80 seconds.

11. A process according to claim 1, wherein said maintaining in the beta range is for 5 to 30 seconds above 980° C.

12. A process according to claim 9, wherein said heating, maintaining and rapid cooling operations are carried out in succession, said flat product circulating amongst an assembly of infra-red tubes and a refractory placed at least 30 mm away from the product the two faces of the product being protected by neutral gas, and then rapidly cooling.

13. A process according to claim 9, wherein said heating, maintaining and rapid cooling operations are carried out in succession, said flat product circulating between two assemblies of infra-red tubes which symmetrically heat each of its two faces, the two faces of the product being protected by neutral gas, and then rapidly cooling.

* * * * *